(12) United States Patent
Crescenzi (10) Patent No.: US 8,677,887 B2
(45) Date of Patent: Mar. 25, 2014

(54) FUNNEL-SHAPED FILTER FOR A MOKA AND MOKA

(76) Inventor: Massimo Crescenzi, Frosinone (IT)

( * ) Notice: Subject to any disclaimer, the term of this patent is extended or adjusted under 35 U.S.C. 154(b) by 89 days.

(21) Appl. No.: 13/382,269

(22) PCT Filed: May 24, 2010

(86) PCT No.: PCT/IB2010/052289
§ 371 (c)(1),
(2), (4) Date: Feb. 17, 2012

(87) PCT Pub. No.: WO2011/004269
PCT Pub. Date: Jan. 13, 2011

(65) Prior Publication Data
US 2012/0141639 A1    Jun. 7, 2012

(30) Foreign Application Priority Data
Jul. 9, 2009 (IT) .............................. RM2009A0355

(51) Int. Cl.
*A47J 31/06* (2006.01)

(52) U.S. Cl.
USPC ................ 99/295; 426/77; 426/425; 426/432

(58) Field of Classification Search
USPC ............................... 99/295; 426/77, 425, 432
See application file for complete search history.

(56) References Cited

U.S. PATENT DOCUMENTS 2,899,886 A * 8/1959 Rodth ............................. 99/295
6,062,127 A   5/2000 Klosinski et al.

FOREIGN PATENT DOCUMENTS

| DE | 74 30 109 U  | 3/1976 |
| DE | 10 2004 056224 | 5/2006 |
| FR | 2 041 380    | 1/1971 |
| WO | 2006/046260  | 5/2006 |
| WO | 2009/053811  | 4/2009 |

OTHER PUBLICATIONS

PCT Search Report of International Application No. PCT/IB2010/052289 filed on May 24, 2010 in the name of Massimo Crescenzi.
PCT Written Opinion of International Application No. PCT/IB2010/052289 filed on May 24, 2010 in the name of Massimo Crescenzi.

* cited by examiner

*Primary Examiner* — Rena Dye
*Assistant Examiner* — Chaim Smith
(74) *Attorney, Agent, or Firm* — Steinfl & Bruno LLP (57) ABSTRACT

A coffee-holding funnel for moka-type coffee machines and a moka-type coffee machine utilizing such funnel are described. The funnel and the moka are adapted to be used with single-use capsules containing ground coffee.

16 Claims, 6 Drawing Sheets

FUNNEL-SHAPED FILTER FOR A MOKA AND MOKA

CROSS REFERENCE TO RELATED APPLICATIONS

The present application is the US national stage of International Application PCT/IB2010/052289 filed internationally on May 24, 2010, which, in turn, claims priority to Italian Patent Application RM2009A000355 filed on Jul. 9, 2009.

The present description refers to an innovation in the field of moka-type coffee machines. In particular, the invention relates to a coffee-holding funnel for moka-type coffee machines and a moka-type coffee machine utilizing such a funnel.

It is well known that in the coffee brewing field moka-type machines are doubtless the most widespread ones, especially at household level. This is partly linked to economic factors and factors of practicality of use, but also to factors of cultural/traditional type and/or personal taste.

On a more general level, however, there is a generalized tendency to make more complex coffee machines, similar to espresso machines for coffee-serving establishments, fed by single-dose pods or capsules.

This tendency is certainly explainable under a commercial standpoint and finds one of its reasons in the ease of use of the machine.

In fact, using coffee machines, especially espresso-type machines, evidently entails longer and more cumbersome operations, represented in particular by a step of loading the ground coffee and a step of cleaning after use of the same. The loading step, as well as the cleaning step, has been made easier through the use of coffee pods that are subsequently disposed of, thereby simplifying all operations related to use of the machine itself.

This tendency has partly been transferred also into the more specific field of moka-type coffee machines as well, with the adoption of single-use pods to be placed directly in the coffee-holding filter.

However, the use of this type of pod still entails remarkable drawbacks.

First of all, pods are obviously made of water-permeable material and therefore do not implement a hermetic closure with respect to their content. Therefore, their operation should necessarily envisage a second casing, sealed, containing them and preventing coffee from contacting air, thereby losing or altering its organoleptic properties. Moreover, pods of this type do not completely fill the moka filter; therefore, at the closing of the coffee machine itself ground coffee is not adequately tamped.

In the known state of the art there are described pods comprised of materials ensuring preservation of organoleptic properties but that, on the other hand, to be used in a moka-type machine need to be stripped at least of the top cover prior to use. Such a problem has partly been overcome by the development of moka machines provided with systems for piercing and tearing the bottom coating of the pod or capsule.

An example of a coffee machine thus designed is that described in Pat. Appl. WO2009/053811. The evident drawback of such a coffee machine is essentially linked to the difficulty in the cleaning step, due to the presence of various protruding elements apt to guarantee the tearing of the pod coating. Moreover, due to their peculiar function and structure, such elements do not guarantee total safety, in particular to the operator, just in the cleaning step.

Therefore, object of the present invention is to provide an innovative solution to problems still unsolved by the known art, by providing a coffee-holding funnel of a moka-type coffee machine as defined in independent claim 1.

A further object of the present invention is to provide a moka-type coffee machine as defined in claim 14.

A still further object of the present invention is to provide a single-use capsule for brewing coffee, as defined in claim 11.

Secondary features of the present invention are instead defined in the corresponding dependent claims thereof.

As will be illustrated hereinafter in the description, the present invention entails several advantages.

First of all, the present invention perfectly conjugates the advantages deriving from the use of single-use and/or single-dose capsules with those deriving from the use of a moka coffee maker. Accordingly, an utmost level of practicality is achieved, preserving all traditional, taste and economy aspects peculiar to the moka coffee maker.

These and further advantages, as well as the features and operation steps of the present invention, will be made apparent in the following detailed description of embodiments thereof, given by way of example and not for limitative purposes. Reference will be made to the figures of the annexed drawings, wherein.

The present invention will hereinafter be described in detail, making reference to the above-indicated figures.

Figure 1:
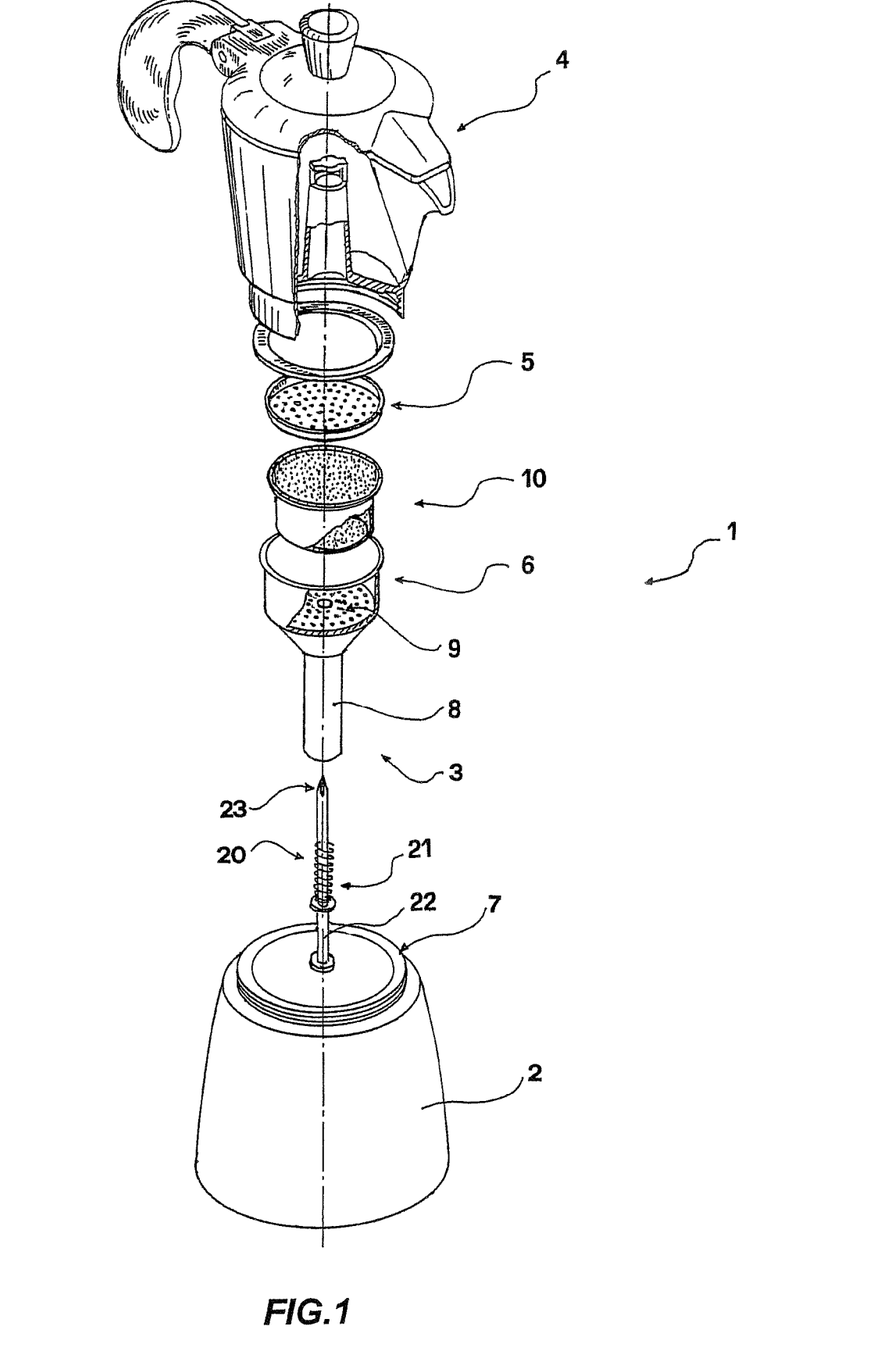
FIG. 1 is an exploded view of a moka coffee maker according to the present invention.

Referring initially to FIG. 1, it shows, in an exploded view, a moka coffee maker 1 according to the present invention.

In particular, the coffee machine 1 comprises a boiler 2, in which water for coffee brewing is introduced.

Inside the boiler 2 it is housed a coffee-holding funnel 3 made according to the present invention. The coffee machine is completed by a holder 4, optionally completed by a bottom strainer 5.

According to the present invention, the funnel 3 comprises a tank-shaped portion 6 apt to receive a capsule 10 containing ground coffee. Preferably, the tank-shaped portion 6 has a shape such as to couple to an edge 7 of said boiler 2.

Moreover, the funnel 3 comprises a tube 8 for the rise of water from the boiler 2 to the holder 4, through the tank-shaped portion 6 and then, as will be explained hereinafter, through the capsule containing the ground coffee.

According to the present invention, the funnel 3 further comprises piercing means, generally denoted by number 20 in the figures, apt to pierce the bottom of the capsule 10 inserted in the tank-shaped portion 6, when the boiler 2 is coupled to the holder 4.

The mechanism by which this piercing occurs will be made evident hereinafter in the description.

Advantageously, though not crucially, the coffee-holding funnel 3 may also comprise a filtering member 9, having a plurality of holes and placed on the bottom of the tank-shaped portion 6.

The piercing means comprises at least one piercing tip (or point) 23. Said tip 23 is able to protrude inside the tank-shaped portion 6 in order to contact the bottom of said capsule 10 and therefore pierce it. The tip 23 may therefore be integral to the funnel and protrude, always inside the tank-shaped portion.

According to the preferred embodiment, the piercing means 20 is movable, so that they may assume a resting position and a piercing position.

In the resting position, the tip 23 does not protrude inside the tank-shaped portion, whereas of course in the piercing position it protrudes thereinside.

Preferably, the piercing means comprises an elastic element 21 apt to constantly return it to the resting position.

According to a first embodiment of the present invention, the piercing means comprises a control rod 22 such that, actuated, it causes the displacement of said piercing means from said resting position to said piercing position. The piercing tip 23 is integral to said control rod and made in correspondence of an end thereof.

The piercing means is preferably contained inside the tube 8, without however preventing the rise of water during operation of the coffee machine.

Figure 2:
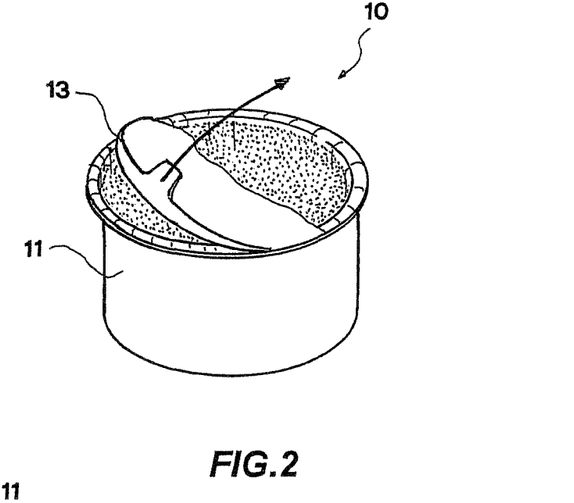
FIG. 2 is a perspective view of a capsule according to the present invention.
Figure 3:
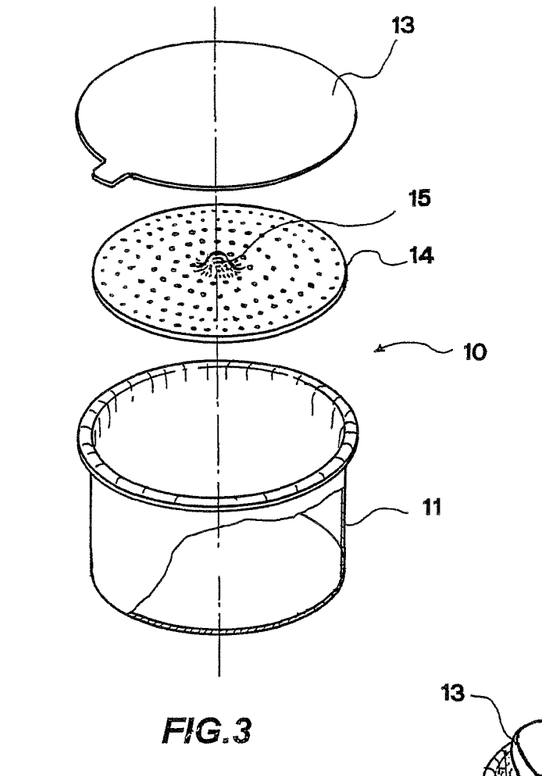
FIG. 3 is an exploded view of the capsule of FIG. 2.
Figure 4:
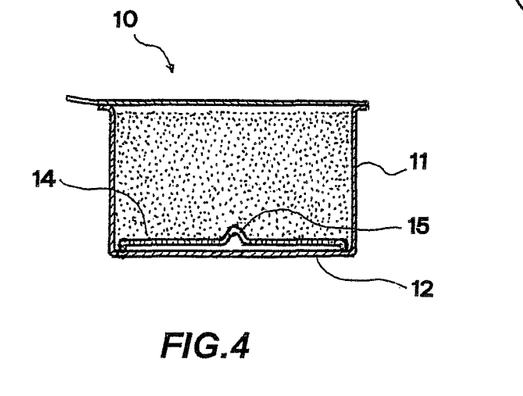
FIG. 4 is a sectional view of the capsule of FIG. 2.

Next, FIGS. 2, 3 and 4 refer to a capsule 10 for brewing coffee, according to the present invention.

The capsule 10 is to be used for coffee brewing with a moka-type coffee machine, in conjunction with a coffee-holding funnel according to the present invention. The capsule comprises a tank-shaped region 11 apt to contain ground coffee, a bottom 12 and a cover 13.

According to an embodiment, the cover may be made in a manner such as to be removable; yet, as will be made apparent hereinafter, this is not strictly necessary.

According to the present invention, at least the bottom 12 of the capsule is made of aluminium. Preferably, the entire capsule and also the cover are made of aluminium.

It can easily be imagined that the aluminium sheet with which the bottom of the capsule is made is of a thickness such as to be easily pierced by a metal tip such as the afore-described one.

The cover 13 is removable, and therefore contrived to be preferably removed when the capsule is inserted in the coffee machine for coffee brewing.

However, the cover, it also being made of a thin aluminium sheet, might even not be removed; this is so since water pressure during coffee machine operation surely suffices to tear it, allowing transit of water itself to the holder 4.

Figure 14:
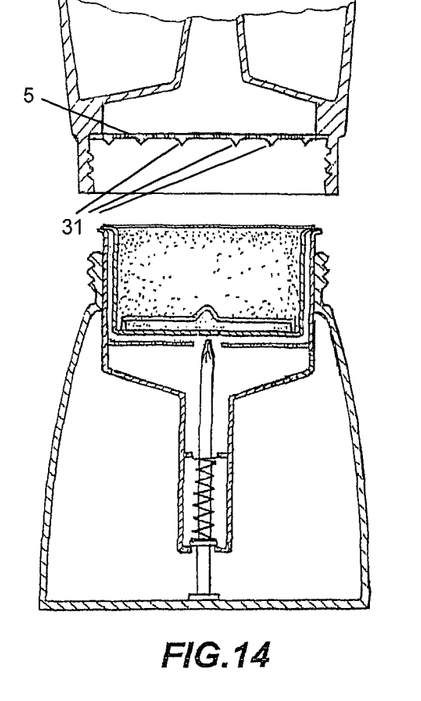
FIG. 14 is a sectional view of a coffee machine according to an embodiment of the present invention.
Figure 15:
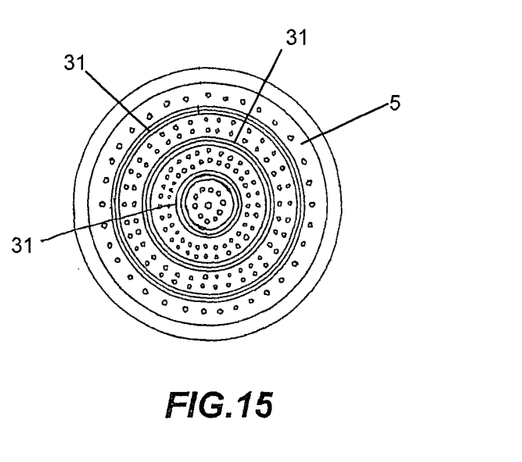
FIG. 15 is a view of a bottom strainer comprising piercing means according to the present invention.
Figure 16:
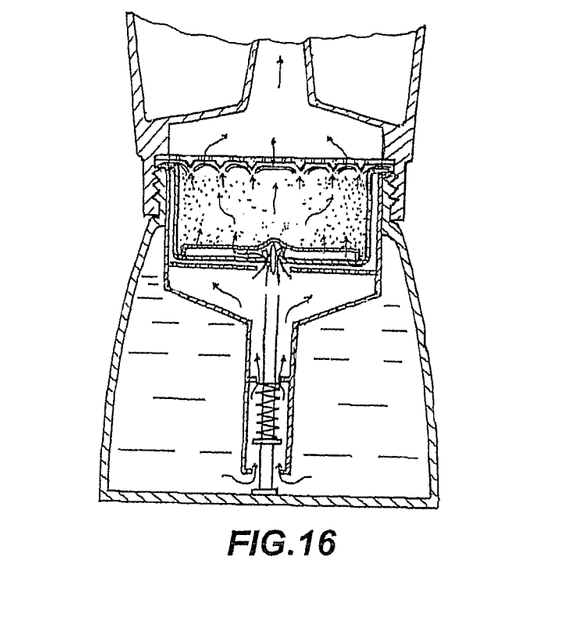
FIG. 16 is a sectional view of a coffee machine, illustrating operation of an embodiment of the present invention, exploiting a bottom strainer with piercing elements like that shown in FIG. 15.

Next, FIGS. 14, 15 and 16 refer to further embodiments of the present invention. In particular, it is also possible to provide at least one element 31 for piercing the cover of the capsule. The piercing elements might, e.g., be connected to the bottom strainer 5 of the holder 4. This would allow piercing also the cover of the capsule during the coupling of the boiler with the holder, thereby preventing the need to remove the cover during the loading step.

In a preferred embodiment of the invention the element for piercing the cover of the capsule is integrated with the bottom strainer 5 as described below.

In particular, the strainer is characterized by the presence of one or more piercing elements 31 apt to rest on the cover of the capsule during the closing of the coffee machine. Such a mechanical action causes demarcation of preferential tearing lines on the cover, or even tearing thereof in correspondence of the piercing elements. Said piercing elements 31 may be made in a manner such as to be protruding in plural points of the bottom strainer, so as to guarantee a tearing of the capsule cover in various zones thereof.

According to an embodiment, these piercing elements 31 may be made according to one or more circular lines, e.g. concentric. Therefore, according to this specific embodiment, the cover of the capsule will preferentially tear along the circumference of each of said concentric circles. As will be obvious to a technician in the field, any piercing element, meant as an element protruding from the bottom strainer, not necessarily limited to lines, in particular circular ones, and connected to the bottom strainer 5, whose function is to facilitate the tearing of the cover of a capsule during coffee brewing, is to be deemed as encompassed by the present description. For instance, in an embodiment of the invention, the piercing elements 31 may coincide with the holes of the bottom strainer 5 themselves. In particular, according to this embodiment, the protruding elements may have the form of a frustum of cone. Geometry and specific size associated to the holes of the bottom strainer as functionally described above can easily be defined by a technician in the field, with no need to provide further technical details here.

Advantageously, as will be made evident below, the capsule 10 may further comprise a diffuser 14, for improving water diffusion inside the capsule during coffee brewing. The diffuser has the shape of a disc, of a diameter substantially equal to the internal diameter of the capsule, and having a plurality of holes 15 for water transit.

In correspondence of the center, the diffuser has moreover a shaping 15 defining a concave space in which the piercing tip 23 finds place when entering the capsule, as illustrated in FIG. 4.

In fact, if the capsule were pierced at the center only, water would tend to rise into the ground coffee, creating a preferential channel along a central axis, without transiting through all the ground coffee present in the capsule, thereby making the brewing process less than effective and the end beverage probably less than pleasant.

On the contrary, the diffuser causes water, after having entered the capsule from the center hole, to be forced to uniformly diffuse to the periphery, by gradually filtering through the holes present on the diffuser.

Figure 5:
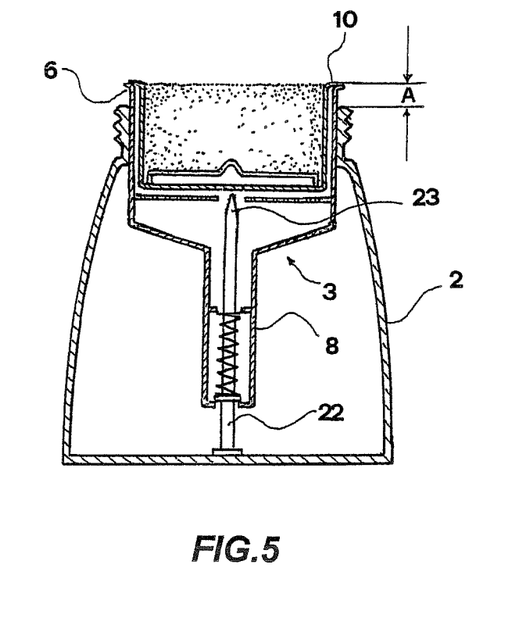
FIGS. 5 and 6 are sectional views of a coffee machine, illustrating operation of a first embodiment of the present invention.
Figure 6:
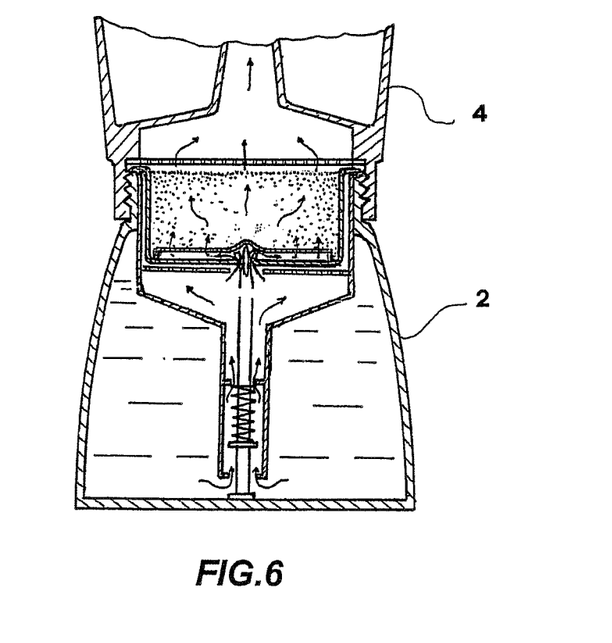

Next, FIGS. 5 and 6 illustrate in further detail the operation modes of the present invention.

In particular, FIG. 5 shows a boiler 2 in which a funnel 3 according to the present invention has been housed.

The control rod 22, protruding from the tube, has a length such as to touch the bottom of the boiler 2 resulting in the funnel being unable to completely enter the boiler, but remaining raised of a portion A.

In this situation, the piercing tip 23 does not protrude inside the tank-shaped portion 6 of the funnel and the capsule 10 is perfectly housed inside the tank-shaped portion 6.

FIG. 6 refers instead to the moment in which the boiler 2 is coupled to the holder 4. This action causes the funnel to be pushed completely inside the boiler.

Therefore, the control rod brings the piercing tip inside the tank-shaped portion 6, optionally through a corresponding hole provided on the filtering member.

Thus, the tip 23 pierces the bottom of the capsule 10 allowing thereafter water transit during coffee brewing, as indicated by arrows in FIG. 6.

Figure 7:
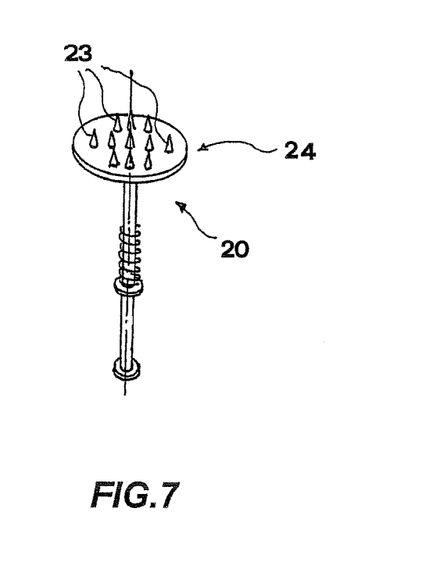
FIG. 7 is a view of piercing means of the capsule according to a first variant of the present invention.

FIG. 7 refers to a first variant of the piercing means of the capsule according to the present invention.

This variant entails the advantage of obtaining improved water diffusion inside the capsule during coffee brewing, concomitantly eliminating diffuser 14 from the capsule, thereby implementing a remarkable saving.

According to said first variant, the piercing means provides a plurality of piercing tips 23, arranged in a manner such as to concomitantly pierce the capsule on more spots on the bottom thereof.

E.g., as shown in FIG. 7, there may be provided a disc 24 connected to the control rod, bearing the plurality of tips 23.

Figure 8:
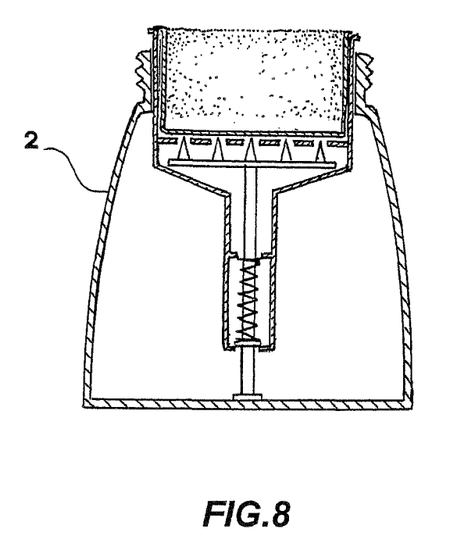
FIGS. 8 and 9 are sectional views of a coffee machine, illustrating operation of a second embodiment of the present invention, exploiting the first variant of FIG. 7.
Figure 9:
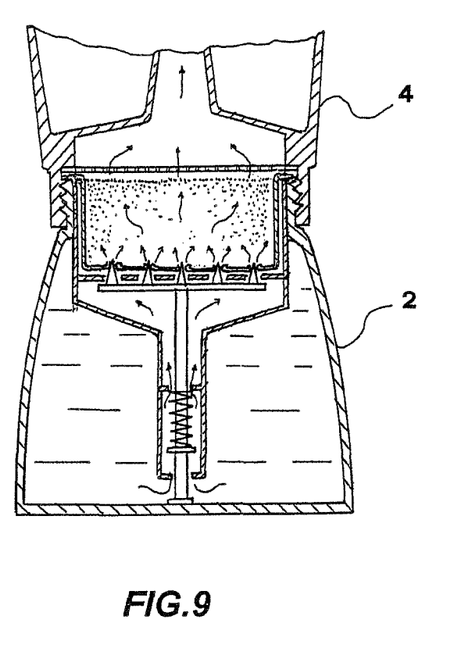

FIGS. 8 and 9 illustrate operation of the present invention, when the piercing means is made according to the heretodescribed variant.

From a functional standpoint, this variant has no specific differences with respect to what has been described hereto, apart from optional constructive differences required to adapt the tunnel to the presence of the disc 24 and of the greater number of tips 23. Such adjustments are however to be deemed within the reach of a technician in the field, and therefore will not be described in detail hereinafter.

Figures 10, 11, 13:
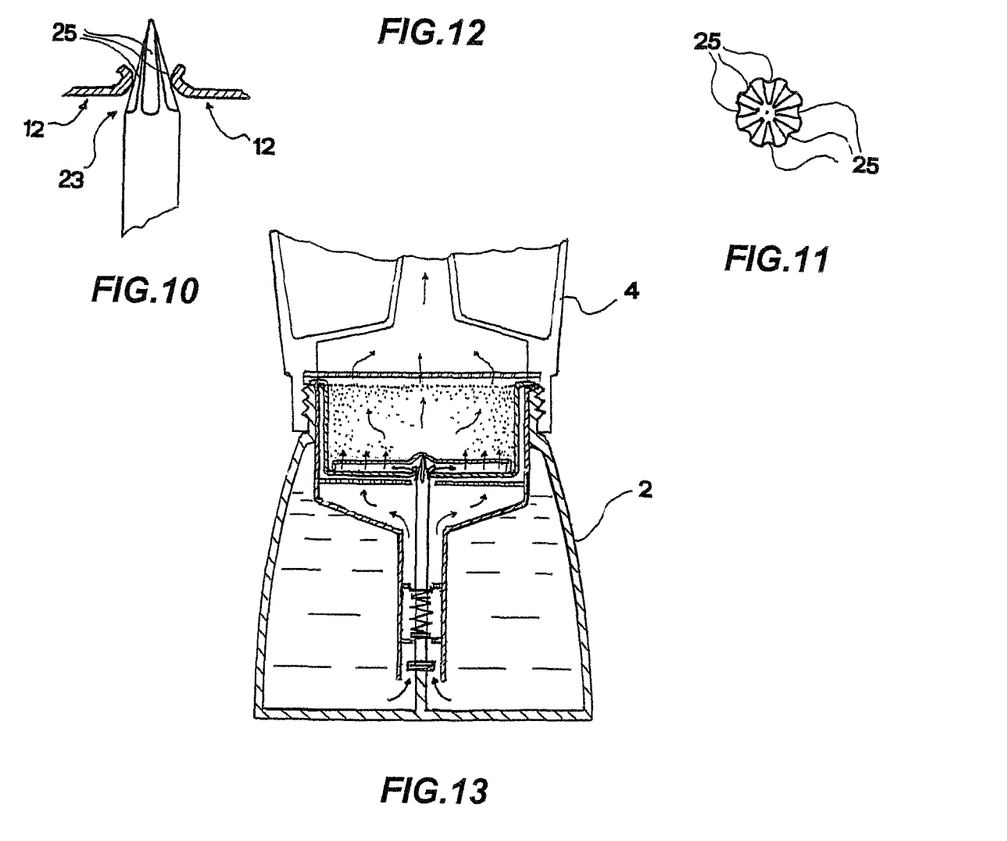
FIGS. 10 and 11 are details of one of the piercing tips (or points), according to a variant of the present invention.
FIGS. 12 and 13 are sectional views of a coffee machine, illustrating a second variant of the present invention, applicable to both of the embodiments described.

FIGS. 10 and 11 are instead detail views of one of the piercing tips, and having a further feature.

In particular, though water rises inside the coffee machine with a certain pressure, surely sufficient to seep through even the minimum gaps between the piercing tip 23 and the aluminium of the bottom of the capsule, the tip itself may be made in a manner such as to facilitate said transit.

Specifically, the piercing tip 23 has longitudinal grooves 25, at least in correspondence of its piercing tip, to facilitate water transit inside the capsule.

Figure 12:
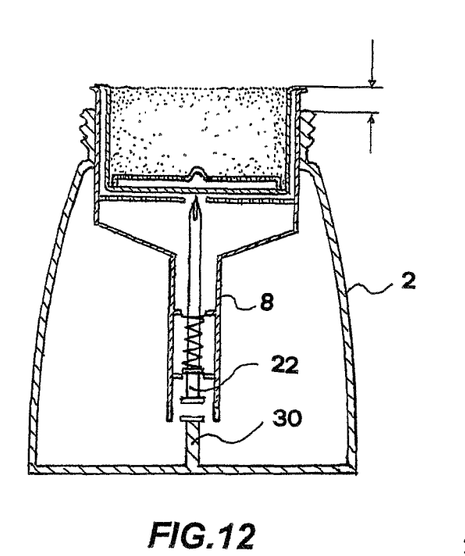

Lastly, next FIGS. 12 and 13 refer to a second variant of the present invention. This variant can be applied to all embodiments described hereto.

More specifically, according to this second variant, the tube 8 for the rise of water has a length such as to completely contain the control rod 22.

This contrivance is particularly useful and advantageous, above all for safety reasons.

In fact, such a contrivance prevents an operator from involuntarily being able to press, e.g., during washing, on the control rod and cause the protrusion of the piercing tips inside the funnel. In fact, this possibility could cause the accidental injuring of the operator.

On the contrary, by lying, when in the resting position, completely inside the tube, the control rod cannot be actuated involuntarily.

However, in order to be able to operate according to modes analogous to what has been described hereto, according to this variant, it necessarily has to be provided for the boiler 2 to have, on the bottom thereof, an actuating element 30 positioned in a manner such as to cooperate with the control rod 22 internal to the tube 8 during the coupling of the boiler 2 with the holder 4.

The present invention has been hereto described with reference to preferred embodiments thereof. It is understood that other embodiments might exist, all falling within the concept of the same invention, and all comprised within the protective scope of the claims hereinafter.

The invention claimed is:

1. A coffee-holding funnel for a moka-type coffee machine having a boiler and a holder, the funnel comprising
    a tank-shaped portion adapted to receive a capsule containing ground coffee and having a shape such as to couple to an edge of said boiler,
    a tube for rise of water from said boiler to said holder through said tank-shaped portion during use of the coffee machine, and
    movable piercing means adapted to pierce a bottom of the capsule when inserted in said tank-shaped portion when said boiler is coupled to said holder, in a manner such that said piercing means may assume a resting position in which said piercing means do not protrude inside said tank-shaped portion and a piercing position in which said piercing means protrude inside said tank-shaped portion.

2. The coffee-holding funnel according to claim 1, further comprising
    a filtering member having a plurality of holes, placed on a bottom of said tank-shaped portion.

3. The coffee-holding funnel according claim 1, wherein said movable piercing means comprises an elastic element apt to constantly return the piercing means to said resting position.

4. The coffee-holding funnel according to claim 3, wherein said movable piercing means comprises a control rod such that, when actuated, the control rod causes displacement of said piercing means from said resting position to said piercing position.

5. The coffee-holding funnel according to claim 4, wherein said movable piercing means is integral with said control rod.

6. The coffee-holding funnel according to claim 1, wherein said piercing means comprises at least one piercing tip, said at least one tip being able to protrude inside said tank-shaped portion in order to contact a bottom of said capsule and pierce said capsule.

7. The coffee-holding funnel according to claim 6, wherein said at least one piercing means has longitudinal grooves at least in correspondence of its piercing tip, to facilitate water transit inside the capsule.

8. The coffee-holding funnel according to claim 4, wherein said control rod has a length such as to be actuated during the coupling of the boiler with the holder, by contact with a bottom of the boiler.

9. The coffee-holding funnel according to claim 4, wherein said tube for the rise of water has a length such as to completely contain said control rod.

10. The coffee-holding funnel according to claim 9, wherein said boiler has, on a bottom thereof, an actuating element positioned in a manner such as to cooperate with said control rod internal to the tube during the coupling of the boiler with the holder.

11. A moka-type coffee machine, comprising the coffee-holding funnel according to claim 1.

12. The moka-type coffee machine according to claim 11, for use with a capsule, the capsule comprising: a tank-shaped region adapted to contain ground coffee, a bottom, a cover, and a diffuser for improving water diffusion inside the capsule during coffee brewing, said coffee machine further comprising
    at least one bottom strainer of the holder, said bottom strainer having at least one piercing element adapted to pierce the cover of said capsule during the coupling of the boiler with the holder.

13. The coffee machine according to claim 12, wherein said at least one piercing element is protruding from said bottom strainer.

14. The coffee machine according to claim 12, wherein at least one piercing element is made according to one or more concentric circular lines.

15. The coffee machine according to claim 12, wherein at least one piercing element is made in form of a hollow and through frustum of cone, coincident with a hole of said bottom strainer.

16. A method for releasing ground coffee into a coffee machine comprising:
- placing a capsule into the funnel according to claim 1, the capsule comprising a tank-shaped region adapted to contain ground coffee, a bottom, a cover, and a diffuser, for improving water diffusion inside the capsule during coffee brewing; and
- piercing the capsule by the piercing means of the funnel.

* * * * *

UNITED STATES PATENT AND TRADEMARK OFFICE
CERTIFICATE OF CORRECTION

PATENT NO.        : 8,677,887 B2
APPLICATION NO.   : 13/382269
DATED             : March 25, 2014
INVENTOR(S)       : Massimo Crescenzi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this

Twenty-ninth Day of September, 2015

Michelle K. Lee
*Director of the United States Patent and Trademark Office*